(12) United States Patent
Sakano et al.

(10) Patent No.: US 6,433,925 B1
(45) Date of Patent: Aug. 13, 2002

(54) OPTICAL FIBER AMPLIFIER AND OPTICAL TRANSMISSION SYSTEM USING THE SAME

(75) Inventors: Shinji Sakano, Kamakura; Ichiro Yokota, Yokohama; Junya Kosaka, Fujisawa; Takayuki Suzuki, Yokohama, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/098,738

(22) Filed: Jun. 17, 1998

(30) Foreign Application Priority Data

Jun. 19, 1997 (JP) .............................................. 9-162300

(51) Int. Cl.[7] .............................................. H01S 3/17
(52) U.S. Cl. ............................. 359/341.43; 359/337.12; 359/337.13; 359/341; 359/341.3; 359/341.41; 359/341.42
(58) Field of Search ....................... 359/337.12, 337.13, 359/341.3, 341.41, 341.42, 341.43

(56) References Cited

U.S. PATENT DOCUMENTS

| | | | | |
|---|---|---|---|---|
| 5,664,131 A | * | 9/1997 | Sugiya | 359/341 |
| 5,703,711 A | * | 12/1997 | Hamada | 359/337 |
| 5,764,404 A | * | 6/1998 | Yamane et al. | 359/341 |
| 5,864,423 A | * | 1/1999 | Kosaka | 359/341 |
| 5,966,237 A | * | 10/1999 | Sugaya et al. | 359/341 |
| 6,108,123 A | * | 8/2000 | Kinoshita | 359/337 |

FOREIGN PATENT DOCUMENTS

| | | | |
|---|---|---|---|
| EP | 782289 | * | 7/1997 |
| JP | 7281219 | | 10/1995 |
| JP | 08095097 | * | 4/1996 |
| JP | 11017259 | * | 1/1999 |

OTHER PUBLICATIONS

US 5,633,249, 05/1997, Shibuya (withdrawn)*
"2.6 Terabit/s WDM Transmission Experiment Using Optical Duobinary Coding" (22nd European Conference on Optical Communication–ECOC 1996 Postdated Line Paper ThB 3.1 Y. Yano, et al. pp. 5.3–5.6).
"Magnetooptical Variable Optical Attenuator" (Y. Suzuki, et al. 1996, p. 128) ; Not Translated.
"Er: Doped Fiber Amplifier for WDM Transmission Using Fiber Gain Control" (Technical Report of IEICE, OCS94–66, Y. Nakabayashi, et al pp. 31–36; Abstract In English.
"Configuration Design of Multi–wavelength Er–Doped Fiber Amplifier for WDM Transmission System" (Technical Report of IEICE, OCS95–36 Y. Sugaya, et al. pp. 21–26) ; Abstract In English.
"Dispersion–Compensator–Incorporated Er–Doped Fiber Amplifier" (Optical Amplifiers and Their Applications 994 Technical Digest Series vol. 14 H. Nakano, et al. pp. 130–132).

* cited by examiner

Primary Examiner—Nelson Moskowitz
(74) Attorney, Agent, or Firm—Antonelli, Terry, Stout & Kraus, LLP

(57) ABSTRACT

A variable attenuator is inserted into an optical input part and a feedback control is performed so that an optical input to an amplifying optical fiber becomes constant. Further, a control for changing a total optical output and an optical input to the amplifying optical fiber is performed on the basis of channel number information obtained from a supervisory signal. When light to/from an intermediate optical component is detected and the absence of the component is detected, pumping is suppressed, thereby avoiding occurrence of an optical surge at the time of connection of the optical component and a signal indicative of detachment of the optical component is generated.

7 Claims, 11 Drawing Sheets

FIG. 10

T+:TEC(+), T-:TEC(-), TR:Thermistor, G: Ground, PA:PD Anode, PC:PD Cathode,
LA:LD Anode, LC:LD Cathode, NC:No Connection

| # | SAMPLE | Pin1 | Pin2 | Pin3 | Pin4 | Pin5 | Pin6 | Pin7 | Pin8 | Pin9 | Pin10 | Pin11 | Pin12 | Pin13 |
|---|--------|------|------|------|------|------|------|------|------|------|-------|-------|-------|-------|
| 1 | A | T+ | TR | PA | PC | TR(G) | NC | NC | NC | NC | LA(G) | LC | NC | T- |
| 2 | B | T+ | NC | NC | LA | G | NC | PC | PA | LC | G | TR | TR(G) | NC |
| 3 | C | T+ | T- | TR | NC | TR(G) | PC | PA | NC | G | LC | LA | G | NC |
| 4 | D | T+ | TR | PA | PC | TR(G) | NC | NC | NC | NC | LA(G) | LC | NC | T- |

OPTICAL FIBER AMPLIFIER AND OPTICAL TRANSMISSION SYSTEM USING THE SAME

BACKGROUND OF THE INVENTION

The present invention relates to an optical fiber amplifier for an optical transmission system and an optical transmission system using an optical fiber amplifier. More particularly, the invention relates to an optical fiber amplifier for wavelength multiplexing and a wavelength multiplexing optical transmission system.

By the appearance of an optical fiber amplifier, a light signal having a weak light intensity can be amplified to light having a high output power with little noise. As a result, the optical transfer distance can be made much longer.

Further, since the optical fiber amplifier has a wide gain wavelength range from 1530 nm to 1565 nm, a wavelength multiplexing optical transmission in which a plurality of signal lasers within the amplification wavelength range are simultaneously amplified and transferred can be realized. For example, according to "2.6 Terabit/s WDM Transmission Experiment using Optical Duobinary Coding" (22nd European Conference on Optical Communication—ECOC '96 Postdated Line Paper Th. 3.1), it is realized that lasers of 132 wavelengths from 1529 nm to 1564 nm at the modulation rate of 20 Gb/s per wavelength are simultaneously transmitted over 120 km. In the announcement, an optical fiber amplifier for transmission compensates an optical loss occurring in a wave multiplexing part when the wavelength multiplexing is performed and has a function of increasing the output in order to make the transfer distance longer. An optical fiber amplifier on the transmission side obtains a light output of 21 dBm when the light of 132 wavelengths are simultaneously outputted.

In the wavelength multiplexing transmission, it is necessary to set an optical output of each signal wavelength between a lower limit optical output for keeping a signal-to-noise ratio at a necessary level and an upper limit optical output which does not cause a waveform distortion by a non-linear effect in the transmission line. On the other hand, in the optical fiber amplifier, a gain usually has wavelength dependency (gain deviation) and an output range between wavelengths is accumulated every relay and amplification. Since a signal error occurs when the range exceeds a permissible width of the optical output, it is necessary to suppress the gain deviation between wavelengths by the optical fiber amplifier.

As a method of controlling the optical output of the optical fiber amplifier at the time of wavelength multiplexing, there is a method of adjusting an optical output by an optical attenuator on the output side by executing a gain flattening control so that the optical output of every wavelength becomes constant irrespective of the degree of multiplexing as disclosed in "Er:Doped Fiber Amplifier for WDM transmission Using Fiber Gain Control" (Technical Report of IEICE, OCS94-66, p. 31). In order to satisfy a gain flat condition, however, when an optical input increases, a large optical output from an optical fiber for amplification is requested and a strong pump optical power is accordingly necessary. In order to set the optical output within a predetermined optical output range, the increased optical output is decreased by an optical attenuator to an optical output equivalent to that at the time of low input level, so that it is not efficient.

In "Configuration Design of Multi-wavelength Er-doped Fiber Amplifier for WDM transmission System" (Technical Report of IEICE, OCS95-36, p. 21), another configuration of the wavelength multiplexing Er-doped fiber amplifier is shown. With the configuration of two-stage amplifier, gain flattening control is performed by an amplifier at the front stage to thereby keep the gain constant irrespective of an optical input. In the optical fiber amplifier, since the wavelength strongly depends on gain, by executing the gain flattening control, it can be controlled so that the gain dependency of the wavelength does not depend on the optical input. In a post-stage amplifier, an optical attenuator is arranged in an input part and it is controlled so that the value of an optical input to the amplifying part is constant. In this manner, while maintaining the whole light gain to be constant, it is controlled so that the optical output is constant. Further, by designing so that gain tilt at the front and rear stages is cancelled, the whole gain flatness can be obtained without using an optical filter. The optical output is set so that the total optical output of all of the wavelengths is constant by decreasing an output of 7 dBm of each channel at the time of four-channel multiplexing to 1 dBm at the time of 16-channel multiplexing.

The optical fiber amplifier is used not only for amplifying a light output in the event of wavelength multiplexing but also for compensating a loss in a functional optical component. As the distance of the optical fiber transmission line having wavelength dispersion is increased, a dispersion value becomes larger. In order to eliminate an influence caused by the dispersion, it is necessary to compensate the wavelength dispersion. In "Dispersion-Compensator-Incorporated Er-Doped Fiber Amplifier" (Optical Amplifiers and Their Applications 994 Technical Digest Series Vol. 14, p. 130), it is described that a wavelength dispersion compensator is incorporated as an optical function component in the center of an amplifier to compensate dispersion. When an optical component in which a loss occurs is arranged in the central part of an optical fiber amplifier which is divided into two parts, while keeping low-noise performance of the optical amplifier, a loss of the optical function component is seemingly reduced and a pumping efficiency can be increased.

In Japanese Patent Application Laid-Open No. 7-281219, an optical amplifier in which a variable optical attenuator is inserted into the front stage and an output distortion of an optical fiber amplifier is reduced is described. Further, in U.S. Pat. Nos. 5,500,756 and 5,555,477, a supervisory optical control is described.

When light of a number of wavelengths enters an optical fiber amplifier and an output level is controlled so as to be constant, an optical gain expressed by a ratio of an optical output and an optical input changes when the optical input changes. Since the wavelength dependency of gain of the optical fiber amplifier changes when the gain changes, the wavelength dependency of gain changes with the change in the optical input. There is no problem if interval lengths of a transmission line as intervals of providing optical fiber amplifiers are the same and a fixed optical input is supplied to each of the optical fiber amplifiers. In reality, however, there are various interval lengths and various optical input levels. Consequently, an optical fiber amplifier in which the wavelength dependency of gain does not change even if an optical input level changes is necessary. For example, in a reception optical fiber amplifier in which the maximum gain is 30 dB and the optical output is 0 dBm, the dynamic range has to correspond to a range from −30 dBm to −9 dBm. In a relay optical fiber amplifier, the gain of about 40 dB is necessary. In a silica erbium-doped optical fiber amplifier, a gain deviation between 1535 nm and 1542 nm is every large and there is a change corresponding to the gain difference of about 6 dB between the minimum and maximum optical inputs.

A problem of the wavelength dependency will now be described with reference to FIG. 1. FIG. 1 shows a wavelength dependency of an optical output of an EDFA (erbium-doped fiber amplifier) when a total output level is controlled to be constant. A, B, and C in the diagram are arranged in accordance with the order from lower optical inputs. As the optical input increases, the optical output is markedly reduced around 1530 nm and is increased around 1560 nm. Even if an optical filter for correction is inserted so as to flatten the wavelength dependency of the optical output with a specific optical input, since the wavelength dependency characteristic of the gain changes when the optical input changes, the wavelength dependency of the optical output appears. When filters are connected at multiple stages, the deviation is accumulated by the number of stages. In a long distance transmission of 600 km or longer, four to seven relay optical fiber amplifiers are necessary and it is requested to suppress the output wavelength deviation per optical fiber amplifier to 1 dB or smaller.

According to the present invention, as a method of solving the problem, a variable optical attenuator is attached to an input terminal of an optical fiber amplifier in order to maintain input power level to an amplifying optical fiber to be constant. In case of inserting a variable attenuator on the input side of the optical fiber amplifier and controlling so as to maintain input power level to an EDF (erbium-doped optical fiber) to be constant, if a feedback control is executed too quickly, signal outputs of 0 and 1 in a low frequency region (about 10 kHz) of a digital transmission signal are averaged, so that a frequency characteristic of the transmission signal deteriorates. The optical fiber amplifier is a reproducer having a 1R (Reshape) function and should not limit a signal band. Consequently, it is necessary to control so as not to limit a band on a low frequency side of an amplifying optical fiber.

Further, in case of inserting the variable optical attenuator to the input side of the optical fiber amplifier and controlling to maintain the input level to the EDF to be constant, a monitor is disposed after the variable optical attenuator. Since the input to the EDF is controlled to be a constant value by the variable attenuator in the configuration, the actual optical input level to the optical fiber amplifier cannot be directly monitored. It is, however, necessary to monitor the input power level also in a state where the level of the input power is controlled by the variable optical attenuator.

It is desired to optionally change the use frequency in an operating state in the wavelength multiplexing optical transmission. It is necessary to always set the output level of the optical transmission system to be within a permissible range by an optical output per channel in the wavelength multiplexing optical transmission even if the number of transmission channels is changed.

In the foregoing related arts, optical output of each channel is controlled to be the same when all of the wavelengths are available in the wavelength multiplexing optical fiber amplifier. In an actual operation, however, all of the number of channels are not always available. There is also a case such that a small number of channels is used in the beginning and the number of channels is increased in accordance with necessity. It is desired to change a total optical output and to assure the minimum optical output when an optical input is changed.

Not only in the wavelength multiplexing system, in the optical fiber amplifier, an optical surge occurs on the optical output side when the level of the optical input suddenly increases in a short time of few $\mu s$ from a state where the optical input is low. It is a phenomenon peculiar to the optical fiber amplifier and is due to the property to keep the optical gain to be constant. An optical output having a high optical surge may destroy an expensive and important photosensing device. It is therefore necessary to suppress the optical surge. In case of executing the control to keep the optical output at a specific value, when the optical input is small, a potential gain of the optical fiber amplifier is increased. When a high optical input is suddenly received in such a state, an optical surge peculiar to the optical fiber amplifier occurs. In order to suppress the optical surge, it is necessary to suppress rise in the potential gain and to suppress optical pumping as a cause of the potential gain. As described in U.S. Pat. No. 5,355,250, there is conventionally a technique using a method of completely shutting down the optical pumping when an absolute value of the optical input decreases to a value equal to or lower than a specific optical input.

In the optical fiber amplifier operated in a wider optical input width, however, a specific optical input value at which it is discriminated to suppress the pumping is set to a low value. In this instance, when there is an optical input just higher than the specific optical input (that is, the lowest optical input within the operating range), a high pumping state is obtained. When the optical input is recovered to a high optical input in such a state, an optical output like an optical surge is generated. It is, therefore, desired to also suppress the optical output like the optical surge.

When an optical component is inserted into the optical fiber amplifier comprising optical amplifiers at a plurality of stages, there is another factor causing the optical surge. When an optical component is inserted in the optical fiber amplifier, there is a risk that the optical surge occurs when the optical component is again inserted from a state where the component is once detached. For example, a case of pumping optical fibers for amplification at the front and rear stages by one pumping light source in the foregoing "Dispersion-Compensator-Incorporated Er-Doped Fiber Amplifier" will be described. Even if an optical input to the optical amplifier is a predetermined value, an optically disconnected state is obtained when the optical component inserted in the intermediate part of the amplifier is detached. Since no optical input is supplied to the rear amplifying optical fiber, the pumping is increased. When the optical component is again inserted in such a state, the signal light amplified by the front amplifier enters the highly pumped rear amplifying optical fiber, so that an optical surge occurs on the optical output side. It is necessary to suppress the optical surge at the time of re-insertion of the optical component into an intermediate part of the amplifier.

When the structure in which the optical function component can be attached and detached to/from the center of the optical fiber amplifier is used, it cannot be discriminated whether the reduction in the optical output of the rear amplifying optical fiber is caused by a failure or detachment of the optical component. A method of discriminating whether the optical output reduction is due to the detachment of the optical function component or a failure in the optical fiber amplifier is necessary.

Further, the construction of an optical system box for housing the optical system is necessary so as not to expose optical fibers and so as to eliminate a failure of an optical fiber disconnection due to bad handling. It is, however, necessary to assure a space for bend radius of the optical fiber necessary for reliability in the housing of the optical fiber, a vacant space occurs when a plurality of optical components are housed due to the necessity of the space for bending, and it causes increase in the size of the system. Consequently, a method of reducing the vacant space as much as possible is necessary to reduce the size of the optical fiber amplifier.

On the other hand, functional arrangement of pins of a semiconductor laser module is different according to manufacturers. It is necessary to properly use semiconductor laser pumping modules having various performances of various manufactures by a single circuit board in accordance with purpose and price from the view point of cost reduction. A pattern of circuit board corresponding to various pin arrangements is effective on suppressing of the quantity of stocks of various kinds of circuit board and elimination of waste in cost.

A cheap small optical fiber amplifying transmission system which always maintains necessary optical output level every wavelength at an optional degree of wavelength multiplexing and has no destructive element such as an optical surge is desired for an optical transmission system from the viewpoints of reliability, popularity, and transmission quality.

SUMMARY OF THE INVENTION

A method of inserting an optical attenuator into an optical input part of an optical fiber amplifier and inserting a fixed optical attenuator into an input part of an optical amplifier in accordance with an optical input level so as to set the optical input level to an amplifying optical fiber to be within a specific range is used.

In case of performing a long distance optical transmission, since a loss by an optical fiber transmission line increases, it is necessary to increase an optical output on the transmission side. In this instance, nonlinear self phase modulation or the like occurs in an optical transmission line and a waveform is changed. In designing of optical transmission, the light nonlinear phenomenon is considered. In order to improve wavelength flatness of the amplification factor of the optical fiber amplifier, it is necessary to regulate the optical input range. Consequently, when the optical transmission line is short, an optical attenuator has to be inserted into somewhere. According to the invention, the optical attenuator is inserted on the reception side, that is, near the input part of the optical amplifier. When the optical attenuator is inserted on the optical transmission side and the optical input level to the optical amplifier on the reception side is adjusted, the amount of nonlinear effect is changed and necessity to change the design numerical value every transmission distance is caused. However, by inserting the optical attenuator in front of the optical amplifier on the reception side in a manner similar to the invention, common nonlinear design is realized irrespective of the length of the transmission line and a common waveform characteristic can be used.

Further, as a method of improving the accuracy of the optical input range and eliminating the necessity to insert a fixed optical attenuator of different optical attenuation each time in accordance with a using state, a variable optical attenuator is inserted into an optical input part of the optical fiber amplifier to adjust the optical input level to the amplifying optical fiber to be constant. The attenuation of light is adjusted by monitoring the level of light just after attenuation and executing feedback control to the variable optical attenuator so that the monitored value becomes always constant.

The principle will be described. The wavelength dependency of gain of the optical fiber amplifier strongly depends on the gain of the optical fiber amplifier. This will be again described with reference to FIG. 1. FIG. 1 shows the wavelength dependency of gain when a wavelength multiplexed optical input is amplified in a lump and an optical output is controlled to be constant. Total optical inputs obtained by adding optical inputs of wavelengths are larger in accordance with the order of A, B, and C. The optical gain is expressed by the ratio of an optical output and an optical input. When the optical output is controlled to be constant, the gain becomes smaller by 10 dB each in accordance with the order of A, B, and C as the optical input becomes larger. When the optical input is small and the optical gain is large, the optical gain near 1530 nm rises remarkably high as compared with other wavelengths. When the optical input is high and the optical gain is small, the gain in a short wavelength zone is suppressed as C. The gain reduction becomes small on the long wavelength side.

In the optical transmission system, an optical output to the optical fiber amplifier is specified to a narrow width, for example, about ±1 dB from the viewpoint of use. Since an interval loss of an actual transmission line is not always constant, the optical input is changed by about 20 dB by the loss of set intervals. In the case where the wavelength range from 1530 nm to 1560 nm is used in the wavelength division multiplexing optical transmission and light in the wavelength range is uniformly amplified in a lump, if the optical input level is changed, the optical gain is changed, so that the wavelength dependency of the optical gain is changed.

According to the invention, by setting the range of the optical input to the amplifying optical fiber to be within a specific range, the wavelength dependency of the optical output can be suppressed to be relatively small. For example, when the optical input is higher than the predetermined range, by inserting a fixed optical attenuator, the optical input can be set to be within the desired optical input range.

By adjusting the attenuation so that the optical output from the optical attenuator is set to be constant in correspondence to the optical input of the optical fiber amplifier to make the optical input to the amplifying optical fiber constant, the accuracy can be further raised. Since the optical amplification amount in the amplifying optical fiber can be set to be constant, the wavelength dependency of gain does not change. In FIG. 1, the optical attenuator in the input part is adjusted always to be coincided with A having the largest gain (smallest optical input). With respect to the wavelength characteristic of gain, the gain is corrected by an optical filter or the like so that the wavelength dependency is flattened by coinciding the gain peak at 1535 nm and the gain near 1550 nm with the gain at 1540 nm. An optical fiber amplifier for wavelength multiplexing in which the wavelength dependency of gain is flat corresponding to a wide dynamic range of optical inputs can be constructed.

In the above method, by increasing the loss on the input side, the optical input to the amplifying optical fiber is adjusted. The optical input to the amplifying optical fiber is always set to be the minimum optical input. By the control, however, when the optical signal input is large, the noise characteristic deteriorates by the attenuation on the input side. A method of improving the drawback will be described. The dependency of the wavelength dependency of gain of an actual amplifying optical fiber on the optical input is not extremely large. The optical input serving as an adjustment reference is set to a point higher than the minimum optical input, for example, by 5 dB. By minimizing the attenuation of the optical attenuator in a range between the optical input higher than the minimum optical input by 5 dB and the minimum optical input, the drawback can be improved. The optical input to the amplifying optical fiber is changed within the range of 5 dB and a small wavelength dependency of about 1 dB is resulted.

A method of controlling the optical output in accordance with the number of channels at the time of wavelength multiplexing will be described. Channel number information on the transmission side is sent to the optical fiber amplifier over a supervisory signal. The optical fiber amplifier receives the channel number information, sets a signal voltage for controlling the optical input and output corresponding to the channel number information, and controls the optical input and optical output to/from the amplifying optical fiber.

In order to assure the minimum optical output of each channel, a total optical output is adjusted in accordance with the number of channels. The optical input level is changed by the transmission interval loss and the total optical input is also changed when a transmission output from a relay is changed in accordance with the number of channels. Since the wavelength dependency of gain depends on the gain of the amplifying optical fiber, it is also necessary to adjust the attenuation of the optical input in accordance with the channel number information so that the gain is set to be constant. For example, in case of 10 dBm (10 mW) at one wavelength, when information of two wavelengths is sent, it is increased by 3 dB (twice) to thereby set 13 dBm (20 mW). When the optical input per channel is −20 dBm (10 $\mu$W), the optical input is increased by 3 dB (twice), thereby setting −17 dBm (20 $\mu$W). In this manner, the optical output of each channel is set to be constant in spite of the change in the number of channels, change in gain of the amplifying optical fiber is eliminated, and the wavelength flatness is assured.

A method of preventing the optical surge will now be described. An optical signal fluctuation time of the system using the optical fiber amplifier is 1 m/sec or shorter (necessary band >1 kHz) and the fluctuation amount is 3 dB or less in the frequencies up to 1 MHz. When optical inputs are averaged in a time longer than time necessary for transmitting the optical signals by about two digits, in a stable state at the average optical input level in a system having therein the optical fiber amplifier, it can be regarded as constant. When the amount is reduced to a value (relative value) which is lower by, for example, 6 dB suddenly (yet, >1 $\mu$s) within 1 m/sec as compared with the averaged optical input, it is regarded as an abnormal reduction in input. When the optical output is controlled to be constant by the optical fiber amplifier, at the time of reduction in optical input, the pumping is increased in order to maintain the optical output. When the optical input is suddenly recovered within 100 $\mu$s in the highly pumped state, an optical surge occurs on the output side. In order to avoid the occurrence of the optical surge, at the time of the abnormal reduction of the optical input to the relative value, the pumping is suppressed to a level at which no optical surge occurs.

According to the invention, the optical input is averaged by monitoring light via a filter of a very low frequency in an analog circuit, storing a sample value of an ms order for about 1s in digital control, and performing the averaging process of the value. Data which is 1s ago is replaced by new data every sampling.

When an input is abnormally lower than the minimum optical input value of the system, the high pumping state is also caused. The high pumping state which cannot be considered as a normal use state has to be avoided. When the optical input gently decreases, the abnormal reduction in optical input by the relative value cannot be detected. Consequently, a loss of signal (LOS) is detected by the absolute value of the optical input and optical pumping is stopped. The LOS can be detected directly by an input monitor when there is no variable optical attenuator. When the variable optical attenuator is used, the LOS is detected by using both of a control signal of the variable optical attenuator and the optical monitor. By the pumping reduction control by the OR logic value between the relative LOS and the absolute LOS detection value, the occurrence of the optical surge is suppressed.

With respect to the optical input monitor used for discriminating the optical input, when the variable optical attenuator is inserted on the input side, the optical input cannot be monitored. As a counter measure, a method of directly monitoring the optical input by arranging an optical tap coupler for monitoring the optical input is installed before the variable attenuator can be considered. There is, however, a problem of deterioration in the optical signal due to insertion of the optical input monitor. As another method of monitoring the optical input while avoiding the drawback, there is a method of obtaining an actual optical input by adding the attenuation obtained from the control signal of the variable optical attenuator and an optical monitor value just after the variable optical attenuator.

A method of suppressing the occurrence of an optical surge caused by re-insertion of an optical function component when the optical function component is inserted into an intermediate part of the optical fiber amplifier comprising optical amplifiers of a plurality of stages. An optical monitor is inserted on the input side of the optical amplifier at the post stage. When the optical monitor detects a value lower than a predetermined value, it is discriminated that the optical component is not connected and the intensity of pumping is reduced. Consequently, the highly pumped abnormal state of the rear amplifier is suppressed and the occurrence of the optical surge at the time of connecting the optical component is suppressed. If the pumping state at the front stage and that at the post stage are independent, the optical output of the pumping light source at the post stage is reduced when the optical component is not connected.

As a configuration of the optical fiber amplifier having optical amplifiers at a plurality of stages, there is a one-pumping and two-stage amplification configuration in which residual pumping light of the front optical amplifier is used for the post optical amplifier. In this case, the optical output of the front optical amplifier is monitored and also the optical output of the rear optical amplifier is monitored. When there is an optical input to the post stage, the pumping is controlled so that the optical monitor at the post stage becomes constant. When there is no optical input to the post stage, the control mode is switched so that the optical output monitor at the front stage becomes constant by low pumping which does not cause an optical surge at the time of connection of the optical component. By using weak light amplified by the front optical amplifier when the optical component is connected, the input to the rear optical amplifier at the time of optical component connection is detected, and the optical monitor at the post stage automatically detects light and the optical output of the post stage is controlled to be constant.

Insertion of the optical component, detection of un-insertion, information transmission, and process inherent modulation band of the optical fiber amplifier, thereby enabling frequency band deterioration when the variable optical attenuator is used to be suppressed. The band of the optical fiber amplifier is usually few kHz or lower and is sub kHz when it is slow. Even if the magnetooptical variable optical attenuator is used, the band control by electric control is necessary. When the optical input is adjusted by the variable optical attenuator, the optical input level is controlled at a slow speed so as not to disturb the band of the amplifying optical fiber.

Mounting will be described. The optical fiber amplifier is constructed by a plurality of fiber type optical components such as amplifying optical fiber, combiner of signal light and pumping light, optical isolator, and optical monitor. For the optical fiber, a bend radius R>30 mm is required in order to assure the reliability for bending. That is, in order to arrange the optical fiber, minimum 60 mm bend space is necessary. When an elongated optical component is arranged along the flow of the optical fiber, it is necessary to add the bend space of the optical fiber to the length of the optical component. For example, for an optical component having the length of 70 mm in will be described. In the monitoring system, when the optical output monitor at the front stage shows a predetermined value and the optical input monitor at the post stage does not show the optical input, it means that the optical component in the center is not inserted. In this case, information of un-insertion is transmitted. When this signal is sent, even if information of abnormal reduction in optical output of the optical amplifier is transmitted, it is not the reduction in optical output due to failure of the optical amplifier, output abnormality is masked.

Control frequency characteristics will be described. When the optical input is controlled, it is preferable to use a magnetooptical variable optical attenuator as described in "preliminary report C-128 for 1996 IEICE electronics society conference", which has response speed of about 300 μs. When the response speed is maximally used, a frequency range of about 3 kHz can be used. When an electric absorption type modulator is employed, the optical input can be controlled in a time of sub ns. When an acousto-optical modulator is used, it can be controlled in a time less than μs. The low frequency side of the output constant control band of the variable optical attenuator is controlled to be slower then the the fiber coupling direction, bending of the fiber of R=30 mm is added to each of both sides. The length of minimum 130 mm is therefore necessary. When the optical component is obliquely arranged, it becomes shorter when seen from one side of a rectangle. For example, when the optical component is inclined by 30°, 70*cos(30°)=60.6 mm. The fiber bend space 60 mm is added to 60.6, so that the necessary length is 120.6 mm which is shorter by 9.4 mm. When the optical component is inclined by 45°, the necessary length is 109.5 mm which is shorter by 20.5 mm. Further, by mounting with the fiber bend space, high density mounting to a realistic space can be realized.

Wiring corresponding to pin arrangement of various pumping lasers will be described. First, wiring corresponding to the pin arrangement of an available semiconductor laser module for pumping is preset in a circuit board pattern. The wiring are connected to commonly connecting pins by pad holes. By connecting pins of different arrangements according to various pumping lasers via a 0 ohm chip resistor or a short-circuiting jumper to pads, the wiring is terminated by open pads so that pins can be selectively connected. Pads of corresponding pins are terminated by open pads at the positions corresponding to the open pads.

As mentioned above, all of possible wiring is arranged by open pads for pins having functions different depending on a pumping laser. In actual use, the open pads corresponding to the function of a pumping laser used are connected via 0 ohm chip resistors or jumper wiring. In stead of open pads, wiring corresponding to possible functions of various kinds is connected to hole pads, the length is adjusted including the bend of pins of a semiconductor laser module, and pins are connected to pads of an adapted pattern, thereby corresponding to different pin arrangements.

By making the circuit board pattern common so as to correspond to a pumping laser at the time of production, the laser module can be changed to a laser module which is easy to use at low cost.

By using the above-mentioned optical fiber amplifier for the wavelength division multiplexing optical transmission system, even if the number of channels is changed, the minimum optical output per channel is kept, an optical function component can be inserted into an intermediate part, an optical surge is suppressed, a small system can be constructed at low cost, transmission quality is maintained, and compensation function of wavelength dispersion and the reliability of the transmission system is enhanced.

BRIEF DESCRIPTION OF THE DRAWINGS

Preferred embodiments of the present invention will now be described in conjunction with the accompanying drawings, in which;

FIG. 10 is a functional block diagram showing arrangements of pins of 14-pin pumping laser modules which are available on the market.

DESCRIPTION OF THE PREFERRED EMBODIMENTS

An embodiment of an optical fiber amplifier as a first embodiment of the invention will be described with reference to FIGS. 1 to 6.

Figure 1:
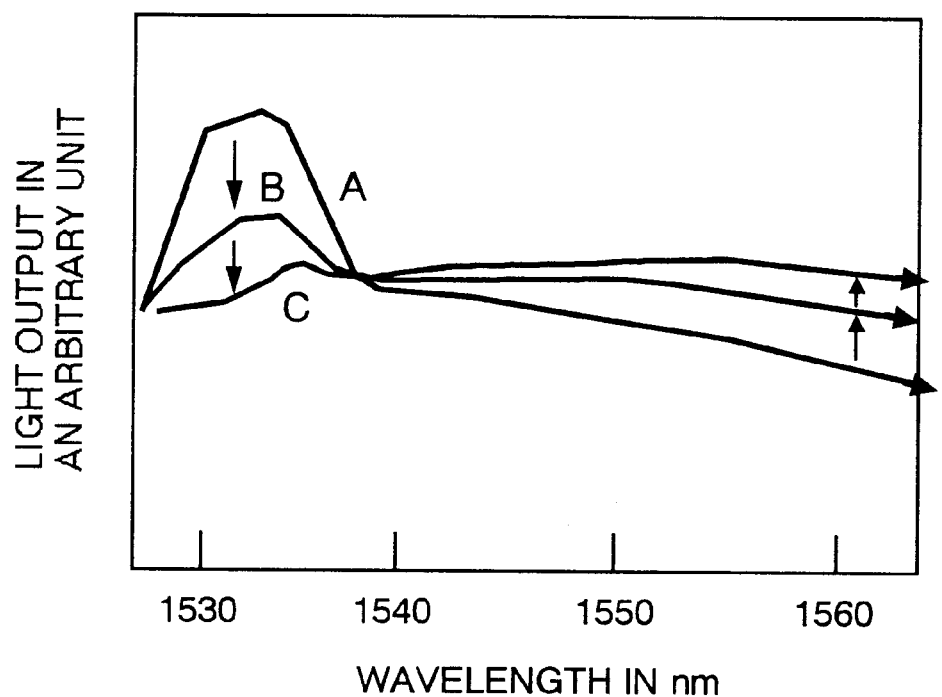
FIG. 1 is a diagram for explaining wavelength dependency of an optical output when a total output is controlled to be constant.
Figure 2:
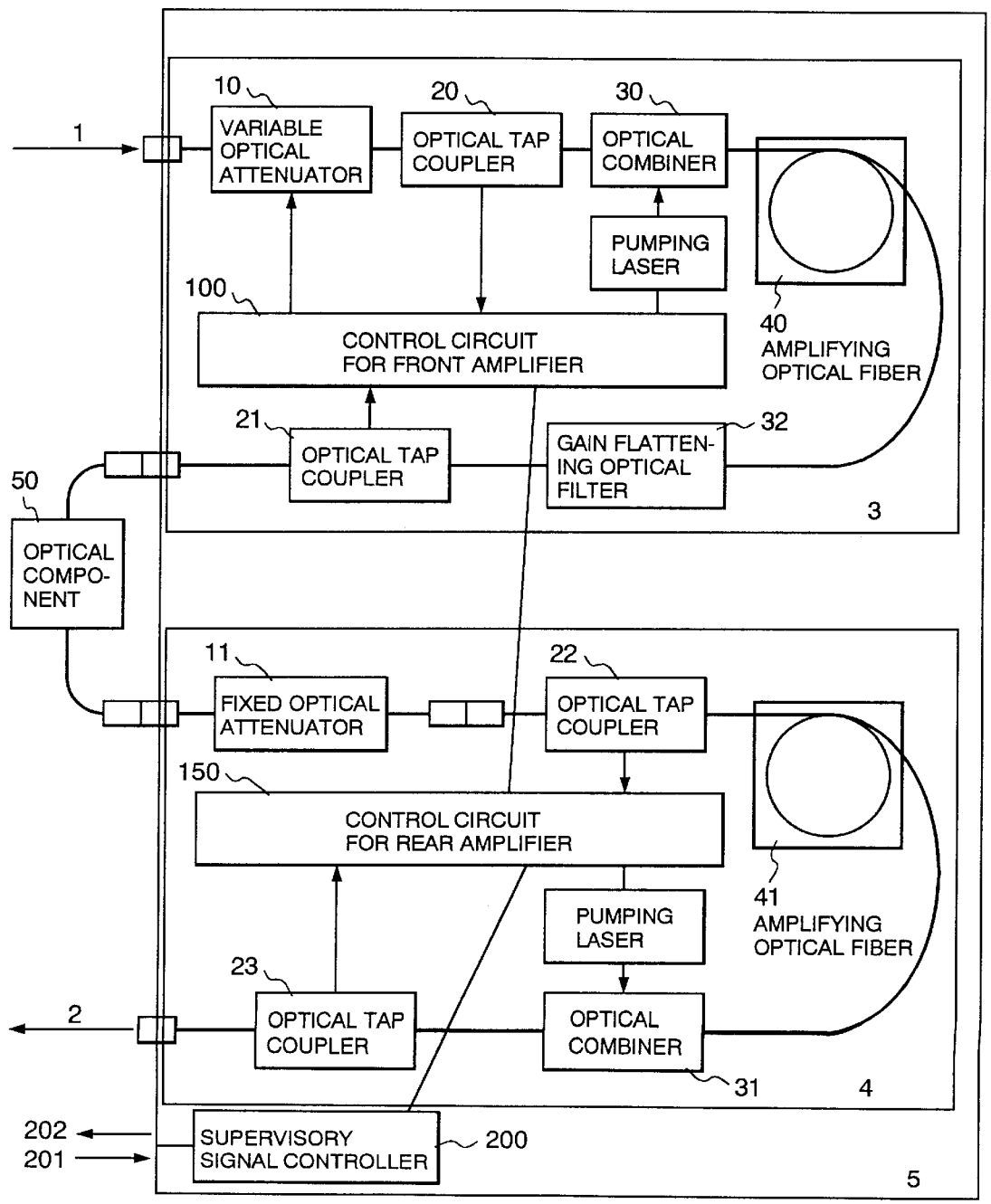
FIG. 2 is a functional block diagram showing the construction of a two-state two-pumping optical fiber amplifier of an optical fiber amplifier according to an embodiment of the invention.

FIG. 2 shows the construction of an optical fiber amplifier 5 for wavelength multiplexing constructed by a two-stage optical amplifier of a front-stage optical amplifier 3 and a post-stage optical amplifier 4 having an optical component 50 therebetween. The optical level of signal light 1 entering an input terminal optical connector is adjusted by a variable optical attenuator 10. A part of the light is separated by an optical tap coupler 20 and is used for monitoring input light. A pumping laser is multiplexed over the signal light by a combiner 30 of the pumping light and the signal light. When the signal light passes through an amplifying optical fiber 40 pumped by the pumping light, the signal light is amplified. A part of the amplified light is tapped by an optical tap coupler 21 and is used for monitoring the optical output. In a control circuit 100 for the front amplifier, a negative feedback is applied to the variable optical attenuator 10 so that the light level of the incident light tapped by the optical tap coupler 20 becomes constant, and further, a negative feedback is applied to the pumping laser entering the amplifying optical fiber 40 by the optical combiner 30 of the pumping light and the signal light so that the level of the light tapped by the optical tap coupler 21 on the output side becomes constant.

Light going out from the optical amplifier 3 at the front stage is combined with the optical component 50, for example, a dispersion compensation optical fiber via an optical connector. After that, the light enters the optical amplifier 4 at the post stage via the optical connector. A fixed optical attenuator 11 is inserted so that the total loss of the optical component 50 and the fixed optical attenuator 11 lies within a deviation of, for instance, 5 dB. By the fixed optical attenuator 11, the optical input to an amplifying optical fiber at the post stage is fixedly adjusted irrespective of the loss of the optical component. In the optical amplifier 4 at the post stage, a part of the light is tapped by an optical tap coupler 22 and is monitored. Main signal light enters an amplifying optical fiber 41. For example, a tap ratio is 95 to 5. A pumping laser is multiplexed over the amplifying optical fiber 41 via an optical combiner 31 of the pumping light and the signal light from the backward and the amplifying optical fiber 41 is pumped from the backward. When the signal light passes through the pumped amplifying optical fiber, it is amplified. A part of the amplified signal light is separated by an optical tap coupler 23 and is monitored as an optical output. A control circuit 150 for a rear amplifier executes a negative feedback control of the pumping light so that the monitored light signal becomes constant. The main signal light is radiated. In this case, an optical component can be just an optical fiber for bypass.

Channel number information and an external management control signal are inputted (201) and outputted (202) to/from a supervisory signal controller 200 and are transmitted/received to/from the control circuit 150 for the rear amplifier and the control circuit 100 for the front amplifier 100.

Figure 3:
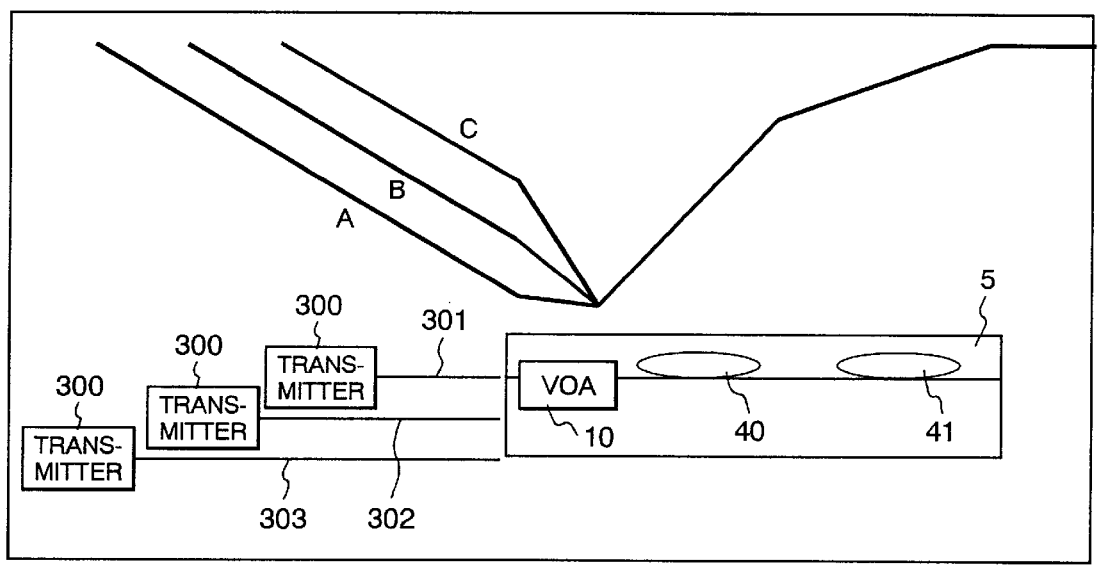
FIG. 3 is an optical level diagram when transmission interval losses of the optical fiber amplifier according to the embodiment of the invention are different.

A control for adjusting the level of light by the variable optical attenuator 10 on the input side of the front optical amplifier 3 will be described with reference to FIG. 3. FIG. 3 is a light level diagram when transmission interval losses are different. In FIG. 3, total optical levels of three cases where interval lengths of transmission line optical fibers are different from optical outputs of the optical fiber amplifier of the embodiment are shown. The interval lengths become longer in accordance with the order of A, B, and C. A denotes a light level when light passes through a short reach fiber transmission line 301 of 120 km. B denotes a light level when light passes through a medium reach fiber transmission line 302 of 83.5 km. C denotes a light level when light passes through a short reach fiber transmission line of 47 km. Even if a transmission output to a transmission line is fixed to 5 dBm per wavelength, since interval losses are different, the optical input level in the optical fiber amplifier is −28 dBm in case of A, −18 dBm in case of B, and −8 dBm in case of C. In the embodiment, it is controlled so that the level of the light monitored just after the variable light attenuator 10 is constant. Consequently, the light level at the input of the amplifying optical fiber 40 is always constant irrespective of the interval loss.

Optical output wavelength dependency at the time of controlling the output of the amplifying optical fiber 40 corresponding to the wavelength multiplexing when the control of the embodiment for making the optical input constant is not applied but the light directly enters the amplifying optical fiber 40 will be described again with reference to FIG. 1. The wavelength dependency of gain of the silica Er-doped amplifying optical fiber 40 depends on the magnitude of the gain (the ratio of the optical input and the optical output). Consequently, when it is assumed that the level of the input light is not adjusted by the variable optical attenuator 10, since gains are changed by the light input levels corresponding to the interval losses as A, B, and C in FIG. 1, there is wavelength dependency. For example, change in optical output in response to change in optical input near 1533 nm is obtained by {3 dB (output change)/10 dB (input change)}. A dynamic range of the optical input is about 20 dB from a range of the interval loss. Consequently, when the light enters the erbium-doped amplifying optical fiber 40 as it is, there is an output change of 6 dB for the signal light of the wavelength of 1533 nm.

According to the embodiment, the dependency of the light input level of the wavelength deviation of the gains at the wavelengths of 1533 nm and 1541 nm is made flat by adjusting the attenuation of an optical attenuator on the light input side.

For example, in case of B and C where the interval losses are lower by 10 dB and 20 dB, respectively, the optical attenuator on the input side is adjusted so that an optical input is always equal to the optical input at the time of loss equivalent to that in the case of A where the interval loss is 22 dB which is the largest in the viewpoint of the transmission line design. The adjustment is automatically performed by a feedback control from the light monitor just after the variable optical attenuator 10. Consequently, for example, in case of the interval losses of C and B, the attenuation of the variable optical attenuator 10 is adjusted to 13 dB and 3 dB. The reason why the loss is 23 dB in total is because the minimum attenuation of the variable optical attenuator 10 is 1 dB. By maintaining the level of the light input to the amplifying optical fiber 40 to be constant, there is no change in the optical input to the EDF irrespective of a change in a transmission line interval loss due to an interval loss, a connection loss of the optical connector, or the like, so that the control causing no gain wavelength deviation due to difference in the optical level 1 in the optical amplifier input part can be performed. Since the wavelength dependency of the gain of a low input A is large especially at wavelengths of 1533 nm and 1541 nm, a gain flattening optical filter 32 is inserted as an optical filter for flattening the wavelength dependency into the front amplifier 3.

The functions of controlling of the variable optical attenuator 10 and monitoring the optical input, detecting an input fluctuation for preventing the optical surge, detecting a disconnection of the optical input signal, and executing a control to prevent the optical surge when the variable optical attenuator 10 is used will be described with reference to FIG. 4.

Figure 4:
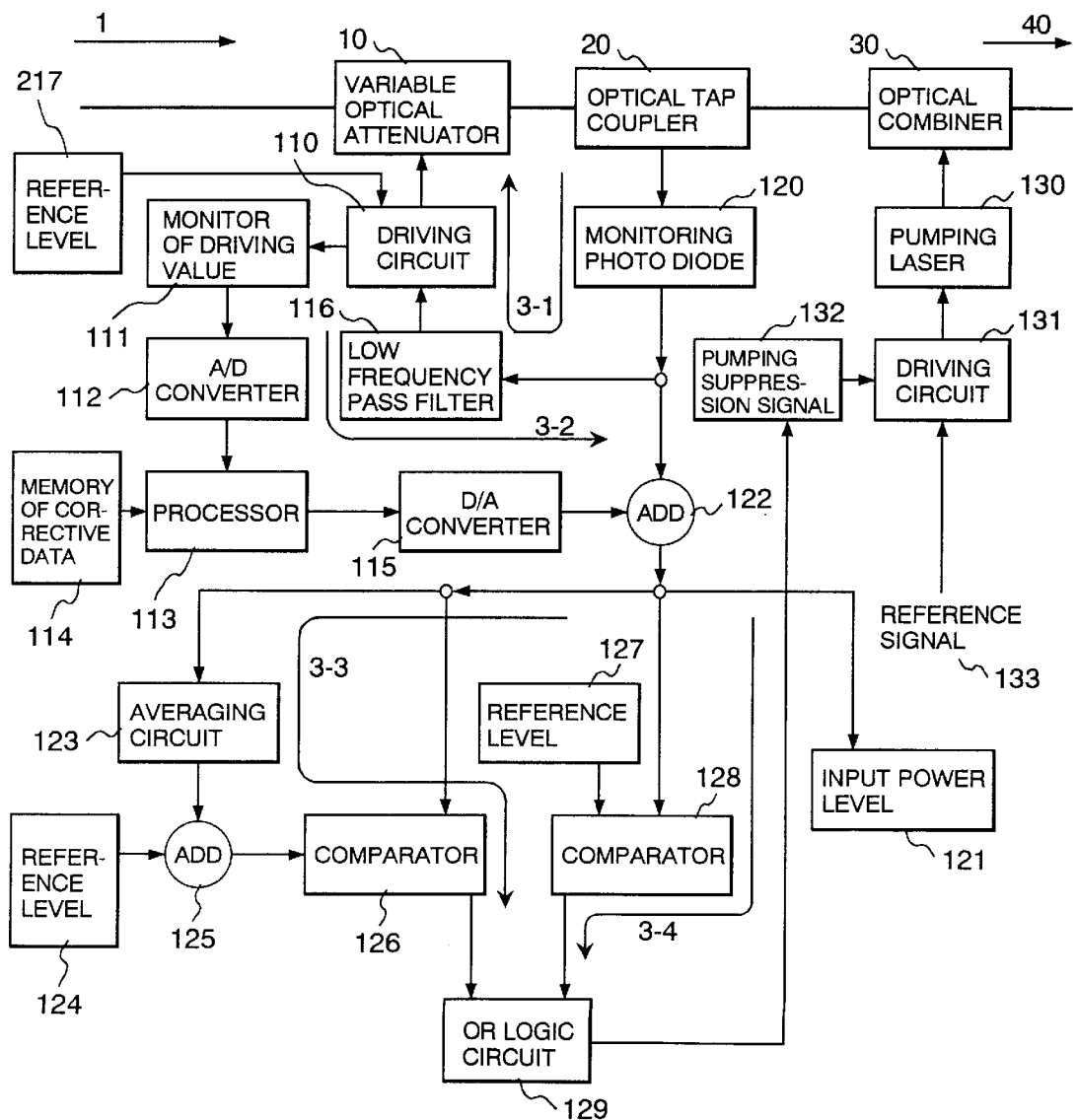
FIG. 4 is a functional block diagram showing a control construction of an optical attenuator and its periphery of the front amplifier of the optical fiber amplifier according to the embodiment of the invention.

FIG. 4 is a functional block diagram showing a control configuration of the periphery of the variable optical attenuator in the front amplifier.

The control of the variable optical attenuator 10 will be described first. An optical input passes through the variable optical attenuator 10 and enters the optical tap coupler 20 for monitoring whose tap ratio is 95 to 5 and a part of the light is tapped for monitoring. Main signal light enters the optical combiner 30 of pumping light and signal light. The light is multiplexed by a controlled pumping laser from a pumping laser diode (LD) 130 in the optical combiner 30 of pumping light and signal light and resultant light travels to the amplifying optical fiber 40. The optical combiner 30 is, for example, an optical combiner of pumping light of the wavelength of 0.98 $\mu$m and signal light of 1.55 $\mu$m. The optical input level is controlled as follows. An electric signal obtained by converting the optical level monitored by a monitor photo diode (PD) 120 is transmitted to a driving circuit 110 of the variable optical attenuator via a low frequency bandpass filter 116. The band on the low frequency side of an optical amplification characteristic of the fiber amplifier is about 3 kHz. When the adjusting speed of the variable optical attenuator 10 is fast, the band on the low frequency side is narrowed and there is a risk that the level of the transmission waveform is fluctuated. The low frequency bandpass filter of 1 kHz or lower is therefore set so that the band on the low frequency inherent to the optical fiber amplifier is not narrowed. Consequently, 3 kHz as a band on the inherently low frequency side of the amplifying optical fiber 40 is not deteriorated by the control. The driving circuit 110 compares the signal with a predetermined optical input monitor value 217, amplifies the difference, and feeds back the amplified value to the variable optical attenuator 10. By executing the control along a negative feedback route 3-1, the optical input becomes constant. The variable optical attenuator 10 and the optical tap coupler 20 hardly have the wavelength dependency of the loss in a necessary wavelength range. For example, a component of 0.5 dB or smaller in total is used.

The monitoring of the optic al input in case of using the variable optical attenuator 10 will be described. Since the optical signal input 1 is adjusted by the variable optical attenuator 10, the accurate value cannot be monitored by the monitor PD 20. It is not preferable to arrange the optical input monitor before the variable optical attenuator 10 since an optical loss is increased. In the embodiment, optical attenuation of the variable optical attenuator 10 is obtained by converting the driving current along a route 3-2.

The driving signal of the variable optical attenuator 10 is detected by a monitor 111 of the driving value and is converted by an A/D converter 112 into a digital signal. The digital signal and a conversion numerical value from a memory 114 of corrective data of the actual optical attenuation of the variable optical attenuator 10 are processed by a processor 113 of the attenuation and the resultant value is converted into again a n analog signal by a D/A converter 115. The actual monitor value and the attenuation of the variable optical attenuator 10 are added by an adder 122, thereby obtaining an optical signal input. For example, although the attenuation is not linear with respect to the driving current in the variable attenuator 10 according to a magnetooptical method, the relation between the attenuation and the current is preliminarily obtained and the data is stored as a conversion numerical value into the memory 114 of corrective data. Since the magnetooptic effect type depends on temperature, a temperature monitor and a correction can be also used. Although a method of obtaining the attenuation of the variable optical attenuator 10 by once executing digital conversion has been described above, the point is that the optical signal input 1 can be obtained by adding the attenuation of the variable optical attenuator 10 without increasing the number of taps of the input monitor.

Optical input fluctuation detection to prevent the optical surge and optical input signal disconnection detection using the optical input monitor will be described. First, a detection operating route 3-3 using no relative optical input for a fixed optical input will be described. A monitor value of the optical signal input is transmitted to an optical input averaging circuit 123. The optical input averaging circuit 123 performs an averaging process to the optical signal input for a time which is 100 ms or longer, for example, 1 second. In an analog manner, the process is performed by inserting a low frequency bandpass filter circuit of RC and detecting a signal after light-to-electricity conversion of low frequency components. In a digital manner, sampling signals of a specific time, for example, 1 ms are accumulated, an averaging process is performed, and old data is replaced by new data with the elapse of time. In this case, in the 1 ms sampling, the optical signal input which is subjected to the signal averaging process is used.

A function of executing a control to prevent the optical surge when the optical input is decreased by a specific level from the fixed optical input will be described. In the control for preventing the optical surge, in order to prevent occurrence of the optical surge at the time of sudden recovery of the optical input, it is necessary to suppress the optical pumping when the optical input is lowered to thereby prevent a state where the potential gain of the amplifying optical fiber is high. In order to set an abnormal reduction in the optical input to a reference value, there is provided a function of setting an input discrimination relative threshold to a discrimination reference value without an optical single input by subtracting, for example, 6 dB from the fixed input. In an actual fixed optical signal, there is a case such that the optical level fluctuates by about 3 dB even in the order of 10 $\mu$s in correspondence to a random signal form. When the control for preventing the optical surge is operated during the fixed signal transmission, a serious influence is exerted on a transmission traffic. Consequently, a margin of 6 dB or 9 dB is set. The optical surge causing a fatal destruction is not occurred by a fluctuation of about 9 dB. The actual optical signal input is compared by a comparator 126. When the optical signal input is low, a pumping suppression signal 132 is generated. The discrimination is executed within 10 $\mu$s. By using the above-mentioned optical input monitor, an abnormal reduction of the relative optical input can be detected. The optical fiber amplifier is not always used for a transmission line having a constant interval loss. When the absence of the optical signal input is detected only by an absolute value, there is a risk such that when a interval loss is small, a fixed optical input is high, pumping follows the fluctuation in level difference even at the time of detaching the optical connector and an optical surge occurs at the time of recovery from a low optical input to a high optical input. Further, in case of connecting optical fiber amplifiers are connected at a plurality of stages like a relay, an optical surge output is propagated. There is a case such that the optical surge output grows depending on a method of controlling the optical fiber amplifiers and there is a risk that an optical component is destructed on the relay destination. On the contrary, when the detection method of the invention is employed, an abnormal light reduction is detected in accordance with a use condition and pumping is suppressed, so that occurrence of the optical surge can be suppressed.

Although the detection of the abnormal reduction in a relative optical input for suppressing the optical surge has been described, the abnormal reduction by a gentle level change of about an averaging time cannot be detected in the process for averaging the optical signal input used in the embodiment. Consequently, it is feared that the abnormal reduction in the optical input cannot be detected with respect to the reduction in the optical signal level which seems to be impossible in a transmission line.

The reduction in the absolute level of the optical signal input is therefore detected in a circuit of a route 3-4. Whether the monitor value of the optical signal input is higher or lower than the absolute reference value 127 is discriminated by the comparator 128. When the absolute value is an impossibly low value, a signal is generated. Since both of the signal from the route 3-3 and the signal from the route 3-4 indicate the risk of the occurrence of the optical surge, the signal is supplied as a pumping suppression signal 132 by an OR logic circuit 129 to a driving circuit 131 of the pumping laser diode 130.

Although the method of processing the monitor value of the optical input on the basis of the attenuation information from the variable optical attenuator has been described in the foregoing configuration, a configuration in which an optical tap is provided just after the optical input part and its signal is used for optical input monitor can be also applied.

The optical output control and the optical input attenuation adjusting control at the time of wavelength multiplexing will be described.

Figure 5:
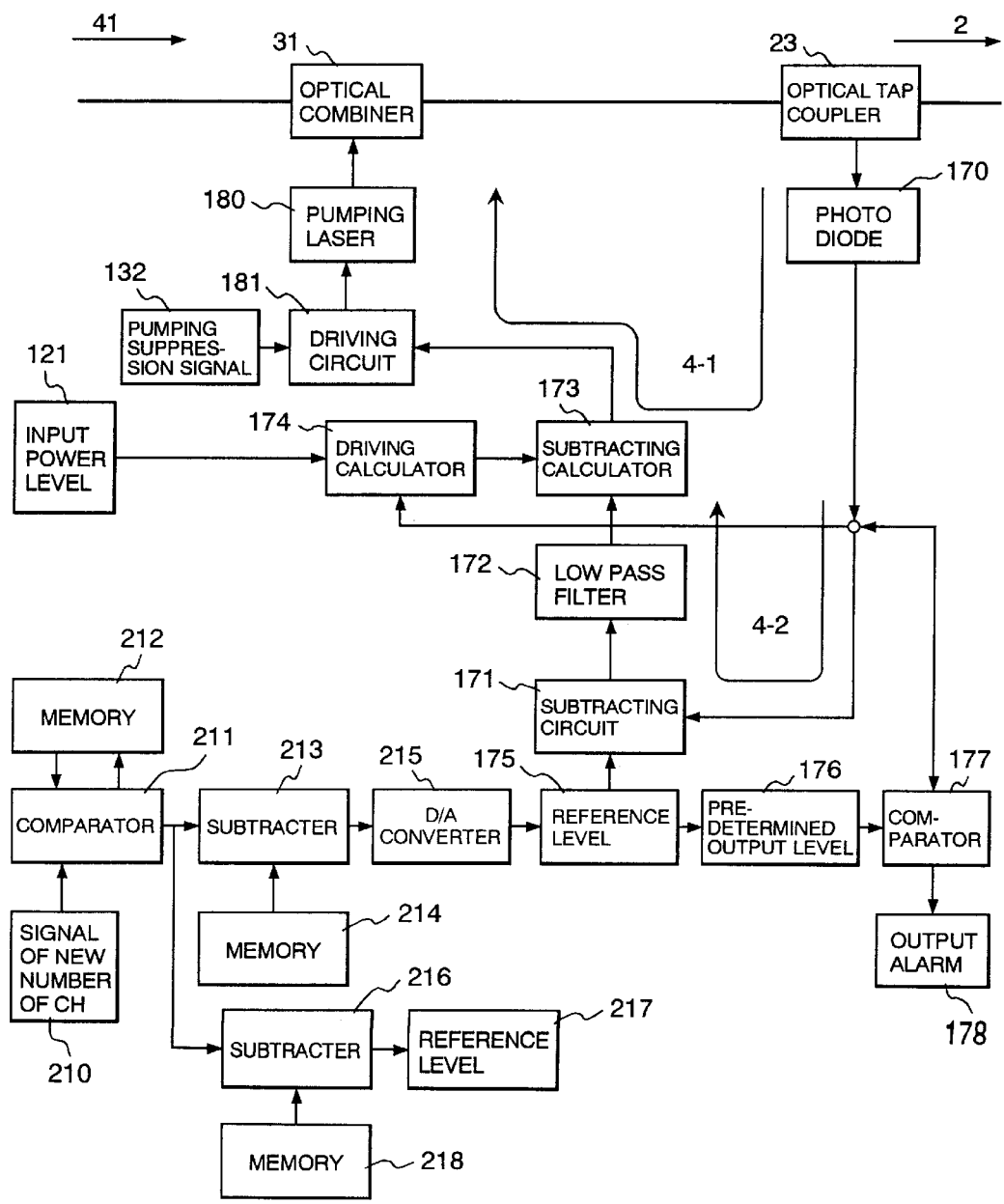
FIG. 5 is a functional block diagram showing the construction of an optical output control of the post amplifier of the optical fiber amplifier according to the embodiment of the invention.

The optical output control will be described with reference to FIG. 5. FIG. 5 is a diagram showing the control of, especially, the rear amplifier of the two-stage amplifier as an embodiment of a control method in which a gain flattening control and a control for making the optical output constant are combined in accordance with transferred channel number information.

An optical signal from the rear amplifying optical fiber 41 passes through the optical combiner 31 of pumping light and signal light and a part of the light tapped by the optical tap coupler 23 having the tap ratio of, for instance, 99 to 1 is transmitted to a monitoring photo diode 170. The main optical signal is outputted as an optical signal output 2.

A loop 4-1 as a gain flattening control will be first described. The tap light of the optical output 2 is converted into an electric signal by the monitor PD 170 and the electric signal is supplied to a dividing calculator 174. The dividing calculator 174 executes a dividing operation of an input power level 121 of the optical signal input 1 of the front amplifier 3 and the electric signal value of the optical signal output, thereby obtaining the gain of the whole optical fiber amplifier 5. A subtracting calculator 173 obtains the difference between the gain and the reference signal value and supplies the resultant value as a feedback signal to a driving circuit 181 of a pumping laser diode 180. In this manner, the control loop 4-1 is constructed so as to obtain a predetermined gain. In this case, since there is no element to limit a signal passing band of the amplifying optical fiber 41 in the gain flattening control, there is no problem to perform a regular fast feedback control of an order of $\mu s$. The driving circuit 181 executes the shut-down operation by the pumping suppression signal of the front and rear stages.

A control 4-2 for making the optical output constant according to the channel number information of the rear amplifier 4 will be described. The monitor signal of the optical signal output which is converted to the electric signal by the monitor PD 170 is transmitted to a subtracting circuit 171 for obtaining difference to make the output constant. A signal 210 of the new number of channels which is separately inputted is compared with a signal of the previous number of channels stored in a memory 212 by a comparator 211. When the signals are the same, the state is kept as it is. When they are different, the value in the memory 212 is updated and a set value 213 of the optical output corresponding to the new number of channels is read from another memory 214. The read value is D/A converted 215 and is set as a reference level 175 corresponding to the specified number of channels. The output is compared with the reference level 175 and the gain is controlled by the control feedback 4-2 so as to eliminate the difference. In the control feedback 4-2, by inserting a low frequency bandpass filter 172 so that the control for making the optical output constant does not regulate the band of the amplifying optical fiber 41, a control of about 1 kHz or lower can be performed. By combining the controls of the loops 4-1 and 4-2, the gain flattening control is executed to the sudden change in the number of channels of 1 m/sec or less and the reduction in the lowest optical level per channel is suppressed.

The channel number corresponding optical output level will be described. For example, when the number of channels is increased from 1 to 16, an output of an optical fiber amplifier including all of the 16 channels has to be typically increased by 12 dB in order to keep the optical output per wavelength channel to be constant. The necessary optical outputs according to the numbers of channels are preliminarily stored into a memory and the optical output is optimally adjusted. As a simple example, when the number of channels is increased to 16, the total optical output is increased by 12 dB.

Since the total optical input also increases in accordance with the increase in the number of channels, an optical level adjusting value by the variable optical attenuator is increased in accordance with channel number information. As a simple example, when the number of channels is increased to 16, the input is increased by 12 dB for the optical level set value at the time of one channel. Thus, the total gain of the front and rear stages is always constant and the gain flatness can be maintained.

In order to obtain the channel number information, a supervisory system is used. In case of using a relay optical fiber amplifier, the operating state of the optical fiber amplifier is notified each other by a main optical signal and another optical signal. The channel number information to be transmitted is sent over a supervisory signal and the foregoing optical output control is performed on the basis of the signal.

Figure 6:
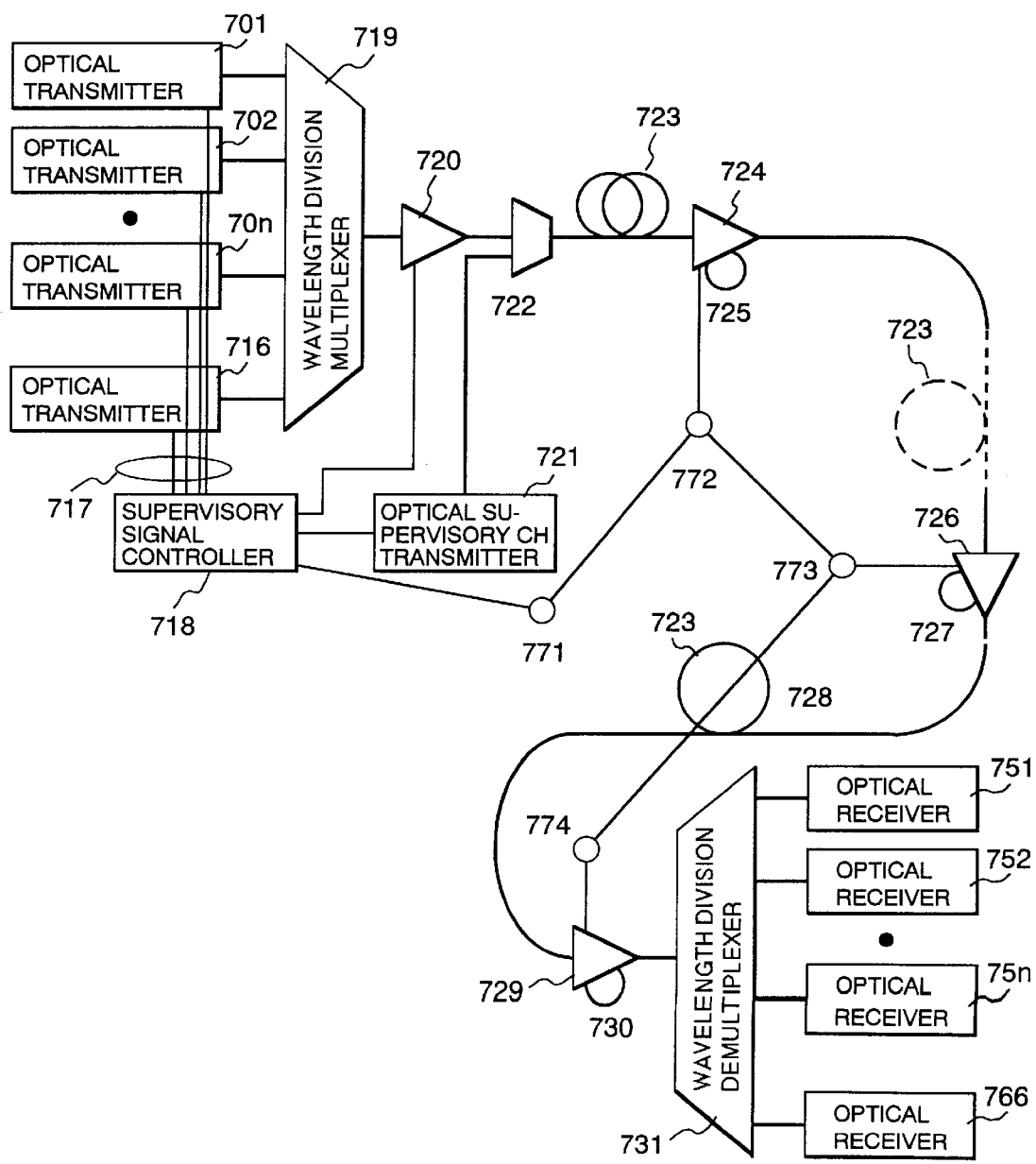
FIG. 6 is a diagram showing a construction example of a wavelength multiplexing optical transmission system according to an embodiment of the invention.

The supervisory system will be described with reference to FIG. 6. FIG. 6 is a diagram showing a configuration of the wavelength multiplexing optical transmission system using the wavelength multiplexing optical amplifier of the invention. Signals from 16 optical transmitters 701 to 716 of different wavelengths are combined to one optical fiber by a wavelength division multiplexer 719. After that, the light enters an optical power amplifier 720 for transmission in order to obtain a necessary optical power and is amplified in a lump. The light is transferred via a transmission line 723 and a loss by the transmission line is compensated by optical fiber amplifiers 724 and 726 for relay, and the like. On the reception side, the light is amplified in a lump by an optical amplifier 729 for reception and the amplified light is demultiplexed by a WDDM (Wavelength Division Demultiplexer) 731 and resultant signals are supplied to optical receivers 751 to 766 corresponding to the wavelengths, respectively, and the signals of respective wavelengths are detected.

When the dispersion in the transmission line is large, fibers 725, 727, and 730 for dispersion compensation are inserted in the optical amplifiers 724, 726, and 729 for wavelength multiplex. Those fibers correspond to the optical component 50 in FIG. 2. With respect to transfer of the channel number information, for example, in the system configuration diagram of FIG. 6, the channel number information is sent over the transmission light of an optical supervisory channel transmission 721 and a supervisory optical signal is transferred through the transmission line via a wavelength division multiplexer (WDM) 722 for the supervisory signal after the transmission optical power amplifier 720. In each of the relay optical amplifiers 724 and 726 and the reception optical amplifier 729, the channel number information is received from the supervisory optical signal. Alternately, the channel number information is sent via a network 771 to 774 of another control system.

If the timing of the channel number information and that of an actual channel number change are not coincided, when the number of channels is changed, there is the possibility that the optical output per channel cannot be assured. Referring again to FIG. 5, in the embodiment, an instantaneous output drop is prevented by setting the speed of the loop 4-2 to be 1 m/sec or larger for the gain flattening control loop 4-1. Further, it is controlled so that the total gain of the whole optical amplifier becomes constant by interlocking the control of the optical output loop 4-2 with the adjustment value of the variable optical attenuator 10 on the optical input control.

As another method of sending the channel number information, a means of modulating and multiplexing a modulation signal of a degree which does not exert a influence on a transmission signal of the main signal light by a pumping laser over the main signal light to be sent and detecting the modulation signal by the next optical amplifier can be also considered.

A configuration of inserting an optical component between optical fiber amplifiers of the two-stage configuration of another embodiment of the optical fiber amplifier as the first embodiment of the invention will be described with reference to FIG. 7.

Figure 7:
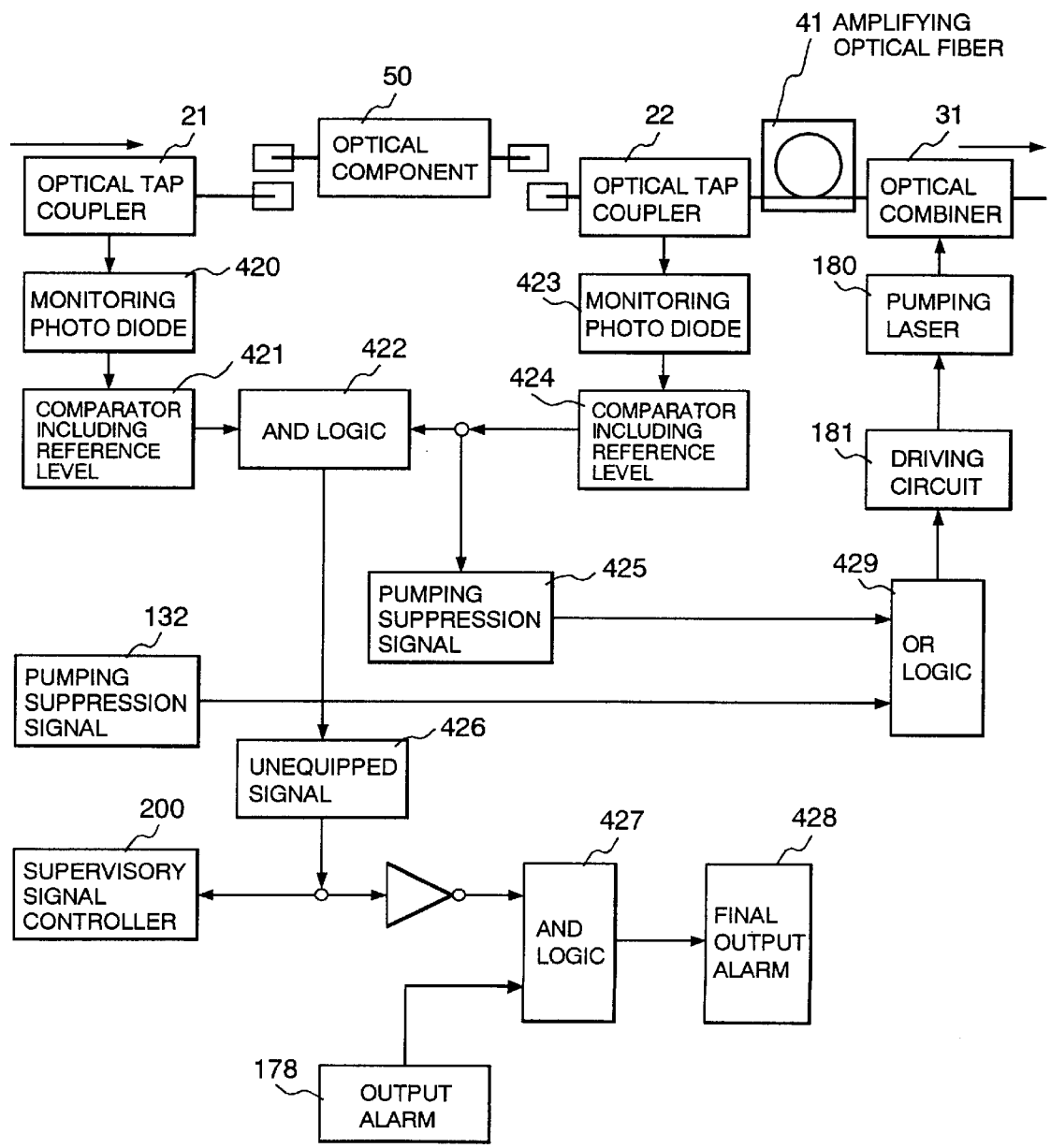
FIG. 7 is a functional block diagram showing a control construction of an intermediate part in which an optical component is inserted the optical fiber amplifier according to the embodiment of the invention.

FIG. 7 shows the configuration from the optical tap coupler 21 for the output monitor at the front stage until the optical combiner 31 of signal light and pumping light at the post stage of the two-stage optical amplifier 5. With respect to the optical output level from the front optical amplifier 3, the light for monitoring is received by a monitoring photo diode PD 420 and is converted into an electric signal. After that, whether the level of the signal is within a specific range or not is discriminated by a comparator 421 including a reference level. The result information is sent to an AND logic circuit 422. As for the optical input to the rear optical amplifier, a part of the light is tapped by the optical tap coupler 22 for monitoring and enters a monitoring PD 423. A comparator 424 including a reference level receives the monitor value and discriminates whether the optical level of the monitor value reaches the inherent optical input value or not. For example, when the optical output level at the front stage is 0 dBm and a loss of the optical component is 10 dB, the optical input to the rear optical amplifier is −10 dBm. When −15 dBm is set as a reference value of the optical input to the rear optical amplifier, the optical input of −10 dBm is discriminated as an optical input by the level comparator at the post stage and is passed to the AND logic 422. When the optical level from the optical component 50 becomes −15 dBm or smaller due to bad connection of the optical connector, a signal indicative of no optical input is sent to the AND logic 422. In the comparator 421 at the front stage, for example, when an optical output is −5 dBm or smaller, a signal larger than the optical output is sent to the AND logic circuit 422. When the output of the front optical amplifier is equal to or smaller than the specific value (−5 dBm), the AND logic circuit 422 does not generate a signal indicative of an unequipped state of the optical component since when there is not optical input to the post stage, the value is naturally equal to or smaller than −15 dBm. Only when the optical output from the front stage is equal to or larger than the specific value (−5 dBm) and is discriminated to be fixed and the optical input to the post stage is discriminated to be equal to or larger than the specific value (−15 dBm), it is discriminated that the optical component is unequipped and optical component unequipped information 426 is sent.

Further, when it is discriminated that the optical signal input monitor at the post stage is below the predetermined level and that there is no optical input, in order to avoid the risk of the optical surge, a pumping suppression signal 425 for suppressing the pumping at the post stage is generated. The pumping control at the post stage is performed by obtaining the OR of the signal 425 and the pumping suppression signal 132 from the OR circuit at the front stage by an OR logic circuit 429. The resultant signal is supplied to the driving circuit 181 of pumping laser in the rear amplifier. The pumping output of the pumping LD 180 is suppressed to the level at which the optical surge does not occur. By the optical component unequipped information 426, the optical output signal reduction is masked by an AND logic circuit 427 and a final output alarm 428 indicative of an inherent failure of the optical amplifier is given. The embodiment relates to the relay or reception side optical fiber preamplifier having therein a dispersion compensation fiber having a loss up to about 10 dB as an optical component 50.

As examples of the optical component 50 used in this case, optical components causing an optical loss such as a dispersion compensation fiber, a fiber grating, a filter, and the like can be mentioned.

Figure 8:
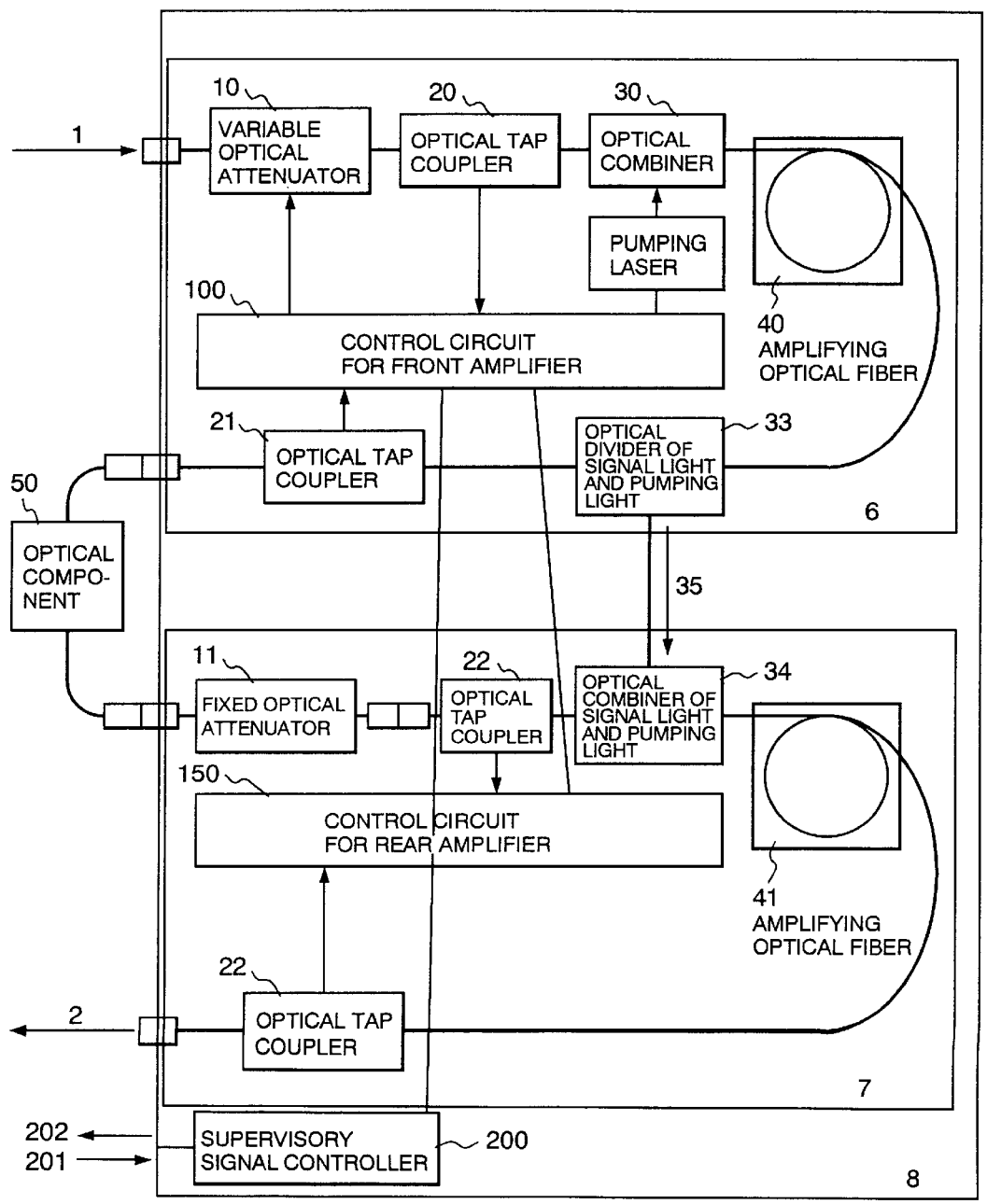
FIG. 8 is functional block a diagram showing the construction of an optical fiber amplifier of a type using residual front-stage pumping light at the post stage of the optical fiber amplifier according to the embodiment of the invention.

A configuration when one pumping laser source is used for amplifiers of two stages of another embodiment of the optical fiber amplifier according to the first embodiment of the invention will be described with reference to FIG. 8. In FIG. 8, the pumping laser source is arranged only at the front stage. After pumping the front amplifying optical fiber 40, the light is divided by an optical divider 33 of signal light and pumping light into residual pumping light 35 and signal light. The signal light travels to the optical tap coupler 21 and the residual pumping light is transmitted to an optical combiner 34 of signal light and pumping light at the post stage. The residual light is again combined with the signal light and the resultant light enters the amplifying optical fiber 41 at the post stage. Even if an intermediate optical component 50 is inserted, the loss can be efficiently compensated by the configuration using one laser light source. The basic construction is shown in "Dispersion-Compensator-Incorporated Er-Doped Fiber Amplifier" which was described in the related art. A method of suppressing the optical surge when the optical component 50 is reinserted in the construction will be described. When the optical component 50 is not connected, there is no light from the optical tap coupler 22 for monitoring at the post stage and optical input disconnection at the post stage is detected. For example, when the loss of the optical component 50 is 5 dB, the loss of the fixed optical attenuator is 5 dB, and the optical output from the front stage is 0 dBm, the level of the optical input disconnection is set to −25 dBm. When the level of an optical output is below the level, a pumping laser suppressing signal is sent from the control circuit 150 for rear amplifier to the control circuit for front amplifier. In this instance, the control circuit 100 for front amplifier controls so that the pumping laser is suppressed to a degree that the residual pumping light 35 does not cause an optical surge when the optical component 50 is re-inserted and controls so that light having the intensity that the input monitoring optical tap coupler 22 can discriminate is emitted when the optical component 50 is connected. It is controlled so that the level of the optical tap coupler 21 for output light monitoring at the front stage becomes constant. For example, it is controlled so that the optical output of the front stage is −10 dBm which is 1/10 of a regular output. Since the optical level becomes −20 dBm when the optical component 50 is properly connected and the optical input disconnection detection at the post stage is −25 dBm or higher, the optical component connection is discriminated. In this case, the pumping control is switched so that the optical output of the optical output monitoring tap coupler 22 at the post stage becomes constant.

Although the control for setting the optical input to the amplifying optical fiber to be constant by the variable attenuator as a part of the optical fiber amplifier has been described above, similar effects can be also obtained by using a variable attenuator separated from the optical fiber amplifier.

In environment which can measure the optical input level, by using a fixed optical attenuator for preliminarily measuring the value and setting the optical input to the amplifying optical fiber within an optical input range where the wavelength dependency of the amplification factor in the whole optical fiber amplifier is relatively flat, although the accuracy is reduced, effects can be obtained.

As examples of the optical component 50 used in this case, optical components causing an optical loss such as a dispersion compensation fiber, a fiber grating, a filter, and the like can be mentioned.

Figure 9:
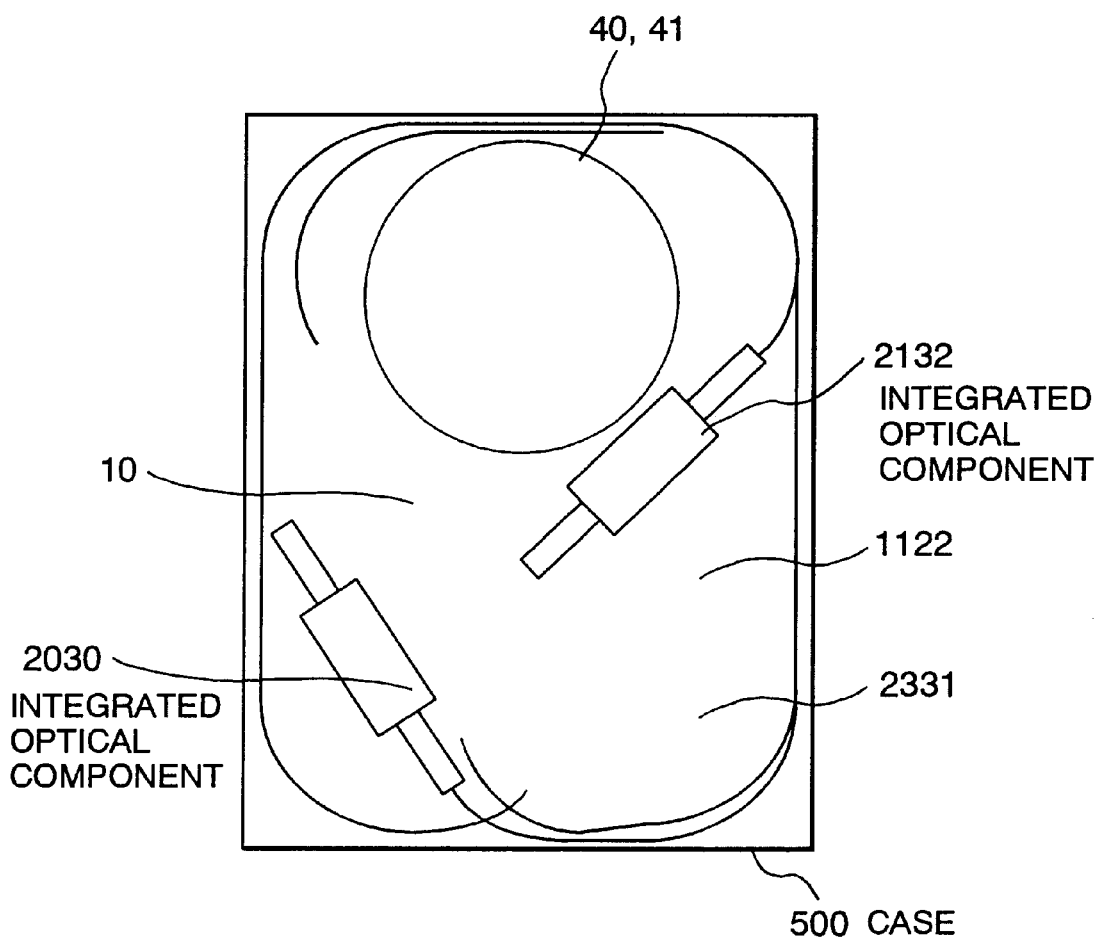
FIG. 9 is a functional block diagram showing an example of housing a fiber type optical component of the optical fiber amplifier according to the embodiment of the invention.

Further another embodiment of the optical fiber amplifier according to the first embodiment of the invention will be described with reference to FIG. 9. FIG. 9 shows a mounting construction of an optical module. An example of mounting optical components in a case 500 having the dimension of 120 mm×165 mm will be described. The embodiment relates to a mounting example of the two-stage amplifier of FIG. 2. As optical components, fiber type optical components are housed as follows. For the front optical amplifier, the variable optical attenuator 10 for optical level adjustment; an integrated optical component 2030 (of an optical tap coupler, a monitoring PD, an optical combiner of signal light and pumping light, and an optical isolator); erbium-doped amplifying optical fibers 40 and 41; and an integrated optical component 2132 (of an optical isolator, a tap coupler, a gain flattening filter, and a tap coupler) are housed. For the rear optical amplifier, an integrated component 1122 (of an optical tap coupler, a monitoring photo diode, and an optical isolator); the erbium-doped amplifying optical fiber 41; an integrated component 2331 (of an optical combiner of signal light and pumping light, an optical isolator, an optical tap coupler, a gain flattening filter, and a monitor photo diode); and the like are housed. In this instance, by inclining the optical components by about 20° to 45° from the side of the case 500, the projection for the side of the integrated optical component having the length of 70 mm is shortened. In the embodiment, one optical component having the length of 70 mm and the width of 25 mm, four optical components each having the length of 70 mm and the width of 16 mm, and a bobbin around which an amplifying optical fiber having the outer diameter of ø70 mm is wound are housed in the case 500. When it is assumed that the interval between components is 2 mm and the end space is 5 mm as a fiber route, the length direction is obtained by {5+70 (EDF bobbin)+(8+2+16+2+8)/sin(45°)+35 (length of the half of the component) *sin(45(°))+(1−sin(45°)*30 (space for fiber bending)+5}= 164 mm. The width direction is derived by {5+(1−cos(30°)) *30 (space of fiber bending)+sin(30°)*70 (length of optical component)+10 (space for fiber)+sin(45°)*70 (length of optical component)+(1−sin(45°))*30 (space for fiber bending)+5}=117 mm.

A case of housing the components in parallel will be described for comparison. The length direction is (5+70 (EDF bobbin)+2+16+2+16+2+16+2+16+2+25+5}=179 mm. The width direction is {5+30 (space for fiber bending)+ 70 (length of component)+30 (space for fiber bending)+5}= 140 mm. Space larger than that in the case where the components are inclined by 15 mm in length and 23 mm in width is necessary.

Figure 11:
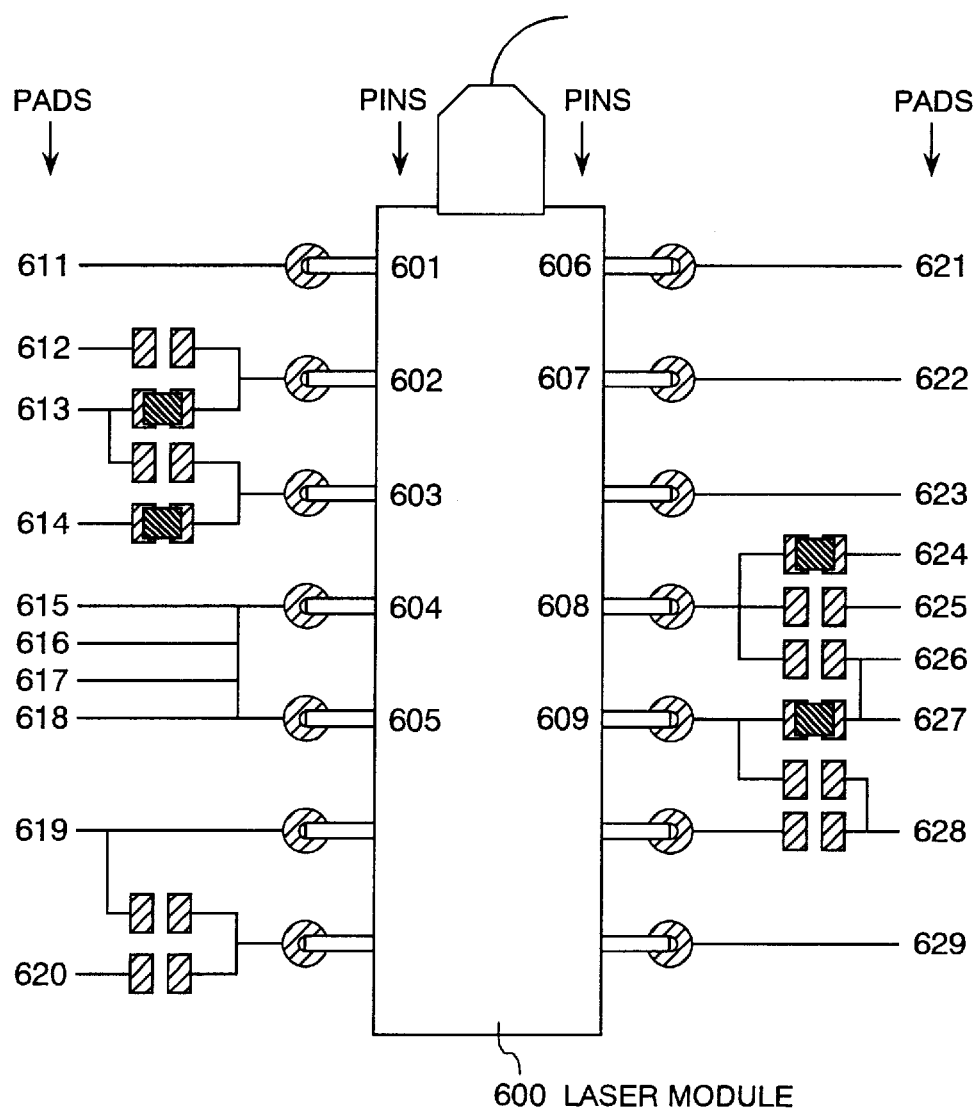
FIG. 11 is a functional block diagram showing an example of connecting of a commercially available pumping laser of A type of the optical fiber amplifier according to the embodiment of the invention.

Another embodiment of the optical fiber amplifier according to the first embodiment of the invention will be described with reference to FIGS. 10 and 11. FIG. 10 shows arrangements of pins of 14-pin pumping laser modules which are commercially available. The modules are roughly classified into four types of A, B, C, and D. The pins of the pumping laser are: positive and negative polarities (TEC+ and TEC−) of a TEC (Peltier device), an anode (LD_A) and a cathode (LD_C) of driving of a laser diode, an anode (PA) and a cathode (PC) of a photo diode for monitoring, and thermistors (TR, TR) for temperature monitoring. FIG. 11 shows the relation between a pumping laser module part of the wiring pattern of a substrate 640 and the pin arrangement of A of a pumping laser 600. In the substrate pattern, a TEC+control terminal 611, a TEC-control terminal 612, a PD cathode control terminal 615, a laser diode anode control terminal 616, a thermistor control terminal 617, a ground terminal 618, a PD cathode control terminal 619, a PD anode terminal 620, a TEC- circuit terminal 621, a laser diode control terminal 622, a thermistor control terminal 623, a thermistor control terminal 625, a ground 627, a laser diode cathode control terminal 628, and a PD anode terminal 629 are arranged as shown in FIG. 11. By using a 0 ohm chip resistor, the arrangement can correspond to pin connection of the pumping lasers of four types. Reference numerals described on the inner side are the pin arrangement of A of the pumping laser 600. By inserting total four 0 ohm chip resistors between a thermistor circuit input (TR) 613 and a second pin 602 of the laser module, between an anode circuit input (PD_A) 614 of the monitor PD and a third pin 603 of the laser module, between an anode control circuit input (LD_A) 626 of the laser diode and a tenth pin 609 of the laser diode, and between a cathode control circuit input (LD_C) 624 of the laser diode and an 11th pin 608 of the laser module, the connection corresponding to the A type laser module can be performed. In the embodiment, a circuit in which LD_A, PD_C, and one (TR(G)) of the thermistors are always connected to the ground is presumed. The arrangement can correspond to the laser modules of other types by connecting five or less 0 ohm chip resistors.

The example of using the 0 ohm chip resistors has been described in the embodiment. In place of the 9 ohm chip resistors, pins can be put up instead of the pads and jumper wires may be used.

Further, it is also possible to change the pads for chip resistors to hole pads into which the pins of the laser module are put up and selectively insert the pins into the holes of the function corresponding to the pin arrangement.

An embodiment of the optical transmission system as a second embodiment of the invention will be described with reference to FIG. 6.

FIG. 6 shows the configuration of an optical transmission system using an optical relay fiber amplifier which can multiplex up to 16 channels.

A case of multiplexing the wavelengths of up to (n) on the transmission side and the 16th wavelength channel will be described. When optical transmitters (Tx) 701 to 716 are set, transmitter setting information 717 is sent to a supervisory signal controller (SV) 718. For example, when the (n)th transmitter 70n is set, information of the total (n) channels of the transmission channel up to (n−1) until then and the 16th channel 716 is updated to (n+1). The information is immediately transmitted to the optical supervisory signal controller (L-SV) 721. The signal light is subjected to signal wavelength multiplexing by the wavelength division multiplexer 719 on the transmission line 723 and the resultant light is amplified in a lump by the optical amplifier 720 for transmission.

A supervisory signal is multiplexed by the combiner 722 of signal light and supervisory signal as another supervisory signal light information. The multiplexed channel number information is detected by each of the relay fiber amplifiers (LA) 724 and 726 and the reception optical fiber amplifier (RA) 729. The multiplexed main signal light is amplified while the dispersion amount is compensated by the optical fiber amplifiers 724, 726, and 729. In the reception part, after the signal is divided by a wavelength division demultiplexer 731 to signals corresponding to the respective wavelengths and the signals corresponding to the wavelengths are converted to electric signals by the optical receivers 751 to 766. After the channel number information is transmitted by the supervisory signal, each of the optical fiber amplifiers gently changes the optical output and the internal setting according to the channel number change in a specific time from few m/sec to few hundreds m/sec. Consequently, the change in the state of each channel signal with the change in the number of channels of the optical transmission system is suppressed and the transmission quality of the whole system is maintained.

The channel number information can be used not only by the optical supervisory signal controller but also by other signal transmitters 771 to 774.

By flattening the gain of the quick response of the optical fiber amplifier, even if the number of channels is suddenly changed, the output fluctuation of each channel is small and there is no fluctuation having ripples, so that the system in which no fault occurs at the time of transmission can be constructed.

By using the optical fiber amplifier having the function of recovering the abnormal reduction in the optical input and suppressing the abnormal peak output of light occurring when dispersion compensators 725, 727, and 730 such as dispersion compensation optical fibers (DCF) are re-inserted for the optical transmission system, the optical surge is suppressed. Consequently, destruction of the optical relays on the downstream side and the optical components 751 to 766 in the receiver, and the like accompanying the transmission of the optical surge occurring on the upstream side of the signal is prevented.

Further, by suppressing the frequency band of the optical attenuator inserted into the optical fiber amplifier for wavelength flattening to 1 kHz or less, waveform distortion does not occur in the low frequency in a signal having the transmission speed of 600 Mbits/s and the quality of the optical transmission system can be kept. Especially, when the relay is constructed by the optical fiber amplifier, since the optical fiber amplifier is a 1R (Reshape) relay, the frequency characteristics are accumulated. When the frequency band is wide, the optical transmission system having little deterioration in the waveform even if the number of relays increases can be constructed.

Each of the optical fiber amplifiers 720, 724, 726, and 729 can be any optical fiber amplifier described in other embodiments.

According to the invention, a general fiber amplifier for wavelength multiplexing optical transmission which does not depend on the transmission interval loss and the number of channels and hardly depends on wavelength dependency of the gain can be provided. The number of channels can be increased/decreased during the operation of the optical transmission system, so that the system becomes flexible. The optical surge is suppressed and the reliability of the optical transmission system using the optical fiber amplifier can be improved. The existence or absence of the optical component is notified to thereby the usefulness is improved. By mounting the optical components with high density, the size of the system can be reduced. Various lasers can be selectively used by one substrate pattern, so that the cost can be reduced.

We claim:

1. An optical fiber amplifier for amplifying a plurality of wavelength multiplexed optical signals, comprising:
   a variable optical attenuator provided at an input of the optical fiber amplifier for receiving said a plurality of signals;
   an optical tap coupler for tapping the plurality of signals passed through said variable optical attenuator into a first tap plurality of signals and a second tap plurality of signals;
   a pumping light source for generating pumping light;
   an amplifying optical fiber for receiving said pumping light and the first tap plurality of signals tapped by the optical tap coupler and generating an amplified plurality of signals;
   a wavelength division multiplexer for supplying said pumping light to said amplifying optical fiber;
   an optic-to-electric converter for receiving said second tap plurality of signals; and
   a controller for controlling an optical attenuation of said variable optical attenuator so as to set an output of said optic-to-electric converter to a predetermined value.

2. The optical fiber amplifier according to claim 1, further comprising:
   a wavelength divider which is provided at the front stage of said variable optical attenuator and divides an optical supervisory signal of a predetermined wavelength from said signal;
   a second optic-to-electric converter for receiving said optical supervisory signal and converting said optical supervisory signal into an electric supervisory signal; and
   a driver for driving said pumping light source,
      wherein said controller controls said driver on the basis of information of a number of channels included in said electric supervisory signal.

3. The optical fiber amplifier according to claim 1, further comprising:
   a wavelength divider which is provided at the front stage of said variable optical attenuator and divides an optical supervisory signal of a predetermined wavelength from said signal; and a second optic-to-electric converter for receiving said optical supervisory signal and converting said optical supervisory signal into an electric supervisory signal, wherein said controller adjusts attenuation of said variable optical attenuator on the basis of information of a number of channels included in said electric supervisory signal.

4. The optical fiber amplifier according to claim 1, wherein response time of a feedback control of said variable optical attenuator is equal to or slower than a frequency on the low frequency side of a bandpass frequency of said optical amplifying fiber.

5. The optical fiber amplifier according to claim 1, wherein said controller obtains an optical input level to said variable optical attenuator by calculating the attenuation of said variable optical attenuator and a monitor value of said first optic-to-electric converter.

6. The optical fiber amplifier according to claim 5, wherein said controller discriminates LOS (loss of signal) when the attenuation of said variable optical attenuator is lower than a first predetermined value and an output from said variable optical attenuator is lower than a second predetermined value.

7. An optical transmission system comprising:

a plurality of optical transmitters;

a wavelength division multiplexer for multiplexing signal lights having different wavelengths;

a supervisory system for transmitting channel number information of number of channels of said signal lights having different wavelengths;

a signal light transmission line;

an optical fiber amplifier for regulating an optical output and attenuation of a variable optical attenuator provided in an input part of the optical fiber amplifier in accordance with the information of number of channels obtained from said supervisory system;

a wavelength divider; and a plurality of optical receivers for receiving said signal light divided by said wavelength divider.

* * * * *